(12) United States Patent
Schwarz et al.

(10) Patent No.: US 11,360,769 B1
(45) Date of Patent: Jun. 14, 2022

(54) DECIMAL SCALE AND CONVERT AND SPLIT TO HEXADECIMAL FLOATING POINT INSTRUCTION

(71) Applicant: INTERNATIONAL BUSINESS MACHINES CORPORATION, Armonk, NY (US)

(72) Inventors: Eric Mark Schwarz, Gardiner, NY (US); Petra Leber, Ehningen (DE); Kerstin Claudia Schelm, Stuttgart (DE); Silvia Melitta Mueller, Altdorf (DE); Reid Copeland, Richmond Hill (CA); Xin Guo, Toronto (CA); Cedric Lichtenau, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/186,302

(22) Filed: Feb. 26, 2021

(51) Int. Cl.
  *G06F 9/30* (2018.01)
(52) U.S. Cl.
  CPC ............... *G06F 9/30025* (2013.01)
(58) Field of Classification Search
  CPC ........ G06F 9/30025; G06F 9/00–3897; H03M 7/24
  USPC ................................................ 708/204, 205
  See application file for complete search history.

(56) References Cited

U.S. PATENT DOCUMENTS

| | | | |
|---|---|---|---|
| 3,654,438 A | | 4/1972 | Wyatt et al. |
| 4,281,663 A | * | 8/1981 | Pringle .................. G16H 15/00 600/502 |
| 4,347,618 A | * | 8/1982 | Kavouras .............. G01S 7/4004 342/26 D |
| 4,589,087 A | * | 5/1986 | Auslander ........... G06F 9/30094 708/525 |
| 4,719,450 A | | 1/1988 | Yamauchi |
| 4,758,973 A | | 7/1988 | Ooyama et al. |
| 4,799,181 A | * | 1/1989 | Tague ..................... G06F 7/491 708/685 |
| 5,191,335 A | * | 3/1993 | Leitherer ................ H03M 7/24 341/50 |

(Continued)

FOREIGN PATENT DOCUMENTS

| | | |
|---|---|---|
| JP | H01237822 A | 3/1988 |
| JP | H01217622 A | 8/1989 |
| WO | WO2014183195 A1 | 11/2014 |

OTHER PUBLICATIONS

G. Slishman, "Fast and Perfectly Rounding Decimal/Hexadecimal Conversions," IBM Research Report RC 15683, IBM T. J. Watson Research Center, Yorktown Heights, New York 10598 (Apr. 1990). 11 total pages, including cover page. (Year: 1990).*

(Continued)

*Primary Examiner* — Keith E Vicary
(74) *Attorney, Agent, or Firm* — Edward J. Wixted, III, Esq.; Blanche E. Schiller, Esq.; Heslin Rothenberg Farley & Mesiti P.C.

(57) ABSTRACT

An instruction to perform scaling, converting and splitting operations is executed. The executing the instruction includes scaling an input value in one format to provide a scaled result. The scaled result is converted from the one format to provide a converted result in another format. The converted result is split into multiple parts, and one or more parts of the multiple parts are placed in a selected location.

20 Claims, 15 Drawing Sheets

(56) References Cited

U.S. PATENT DOCUMENTS

| | | | |
|---|---|---|---|
| 5,272,654 A | 12/1993 | Nix | |
| 5,655,133 A | 8/1997 | Dupree | |
| 5,687,106 A * | 11/1997 | Schwarz | G06F 7/483 708/204 |
| 5,687,359 A * | 11/1997 | Smith, Sr. | G06F 9/30025 708/495 |
| 6,247,116 B1 | 6/2001 | Abdallah | |
| 6,265,995 B1 * | 7/2001 | Sahejpal | G11B 20/12 341/84 |
| 6,591,361 B1 * | 7/2003 | Liao | G06F 9/3001 708/208 |
| 6,671,796 B1 * | 12/2003 | Sudharsanan | G06F 9/30025 708/204 |
| 7,707,233 B2 | 4/2010 | Cornea-Hasegan | |
| 9,292,256 B2 | 3/2016 | Lundvall et al. | |
| 9,778,908 B2 | 10/2017 | Elmer | |
| 9,778,909 B2 | 10/2017 | Samudrala | |
| 10,180,819 B2 | 1/2019 | Brooks et al. | |
| 10,235,137 B2 | 3/2019 | Bradbury et al. | |
| 10,782,932 B2 | 10/2020 | Cowlishaw et al. | |
| 2003/0046338 A1 * | 3/2003 | Runkis | H04L 67/14 709/203 |
| 2007/0022152 A1 * | 1/2007 | Gerwig | H03M 7/24 708/204 |
| 2009/0094441 A1 * | 4/2009 | Hack | G06F 9/30014 712/222 |
| 2011/0145308 A1 * | 6/2011 | Duale | G06F 7/483 708/204 |
| 2014/0188962 A1 | 7/2014 | Hack | |
| 2016/0092165 A1 | 3/2016 | Bradbury et al. | |
| 2018/0165093 A1 * | 6/2018 | Brooks | G06F 9/30025 |
| 2020/0348908 A1 * | 11/2020 | Schelm | G06F 7/483 |

OTHER PUBLICATIONS

IBM, "z/ Architecture—Principles of Operation," IBM Publication No. SA22-7832-12, Thirteenth Edition, Sep. 2019, pp. 1-2000.

Mell, Peter and Tim Grance, "The NIST Definition of Cloud Computing," National Institute of Standards and Technology, Information Technology Laboratory, Special Publication 800-145, Sep. 2011, pp. 1-7.

Schwarz, Eric Mark et al., "Decimal Scale and Convert and Split to Hexadecimal Floating Point Instruction," U.S. Appl. No. 17/186,443, filed Feb. 26, 2021, pp. 1-72.

List of IBM Patents or Patent Applications Treated as Related, Feb. 26, 2021, 2 pages.

* cited by examiner

DECIMAL SCALE AND CONVERT AND SPLIT TO HEXADECIMAL FLOATING POINT INSTRUCTION

BACKGROUND

One or more aspects relate, in general, to facilitating processing within a computing environment, and in particular, to improving such processing.

Applications executing within a computing environment provide many operations used by numerous types of technologies, including but not limited to, engineering, manufacturing, medical technologies, automotive technologies, computer processing, etc. These applications, written in a programming language, such as COBOL, often perform complex calculations in performing the operations. The calculations include, for instance, power and/or exponentiation functions, which often require conversion of data from one format (e.g., binary coded decimal) to another format (e.g., hexadecimal floating point), and vice versa.

In order for an application to perform the conversion from one format to another format, various steps are executed. For instance, to convert from binary coded decimal to hexadecimal floating point, an application includes steps to convert a binary coded decimal number to an integer number, then the integer number is converted to hexadecimal floating point. Further, each of those steps may include sub-steps. This is time-consuming, impacting performance of the computing environment, and affecting availability of computer resources.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes executing an instruction to perform scaling, converting and splitting operations. The executing the instruction includes scaling an input value in one format to provide a scaled result, converting the scaled result from the one format to provide a converted result in another format, splitting the converted result into multiple parts, and placing one or more parts of the multiple parts in a selected location.

By using a single instruction to perform the scaling, converting and splitting operations, performance is improved, and utilization of resources is reduced. By using a single architected instruction to perform the scaling, converting and splitting operations, certain tasks may be performed, such as the scaling, converting and splitting operations, much more efficiently than using a software paradigm. The scaling, converting and splitting operations are performed much faster, reducing execution time, and improving processor and/or overall system performance.

In one example, the one format is a decimal format, and the other format is a hexadecimal floating point format. As an example, the decimal format is a binary coded decimal format. The hexadecimal floating point format provides enhanced precision, which is beneficial for various technologies, improving accuracy and/or performance.

In one example, the scaling includes determining a scale factor, and using the scale factor in scaling the input value to provide the scaled result. The determining the scale factor includes, for instance, obtaining a scale value using an operand of the instruction and using the scale value to determine the scale factor. The using the scale factor includes multiplying the input value by the scale factor to obtain the scaled result.

The scaling facilitates the conversion of a value in one format (e.g., decimal) to another format (e.g., hexadecimal floating point) by isolating certain digits of a number to indicate a selected location in the number to truncate or round, as examples.

In one example, the splitting includes normalizing the converted result to obtain a first normalized result and truncating the first normalized result to obtain one result in a short format of the other format. In one example, the splitting further includes subtracting the one result from the converted result to provide a difference, normalizing the difference to provide a second normalized result, and truncating the second normalized result to obtain another result in a long format of the other format.

By splitting the hexadecimal floating point number into smaller parts, the smaller parts may be used independently, and/or the smaller parts may be summed together to provide a result of greater precision.

As an example, the placing includes placing the one result in a portion of the selected location and placing the other result in another portion of the selected location. The portion of the selected location includes, for instance, first selected bits of a register specified by the instruction and the other portion of the selected location includes second selected bits of the register specified by the instruction.

In one example, a sign of the one result is determined, as well as a sign of the other result. The sign of the one result and the sign of the other result are placed in the selected location.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1A:
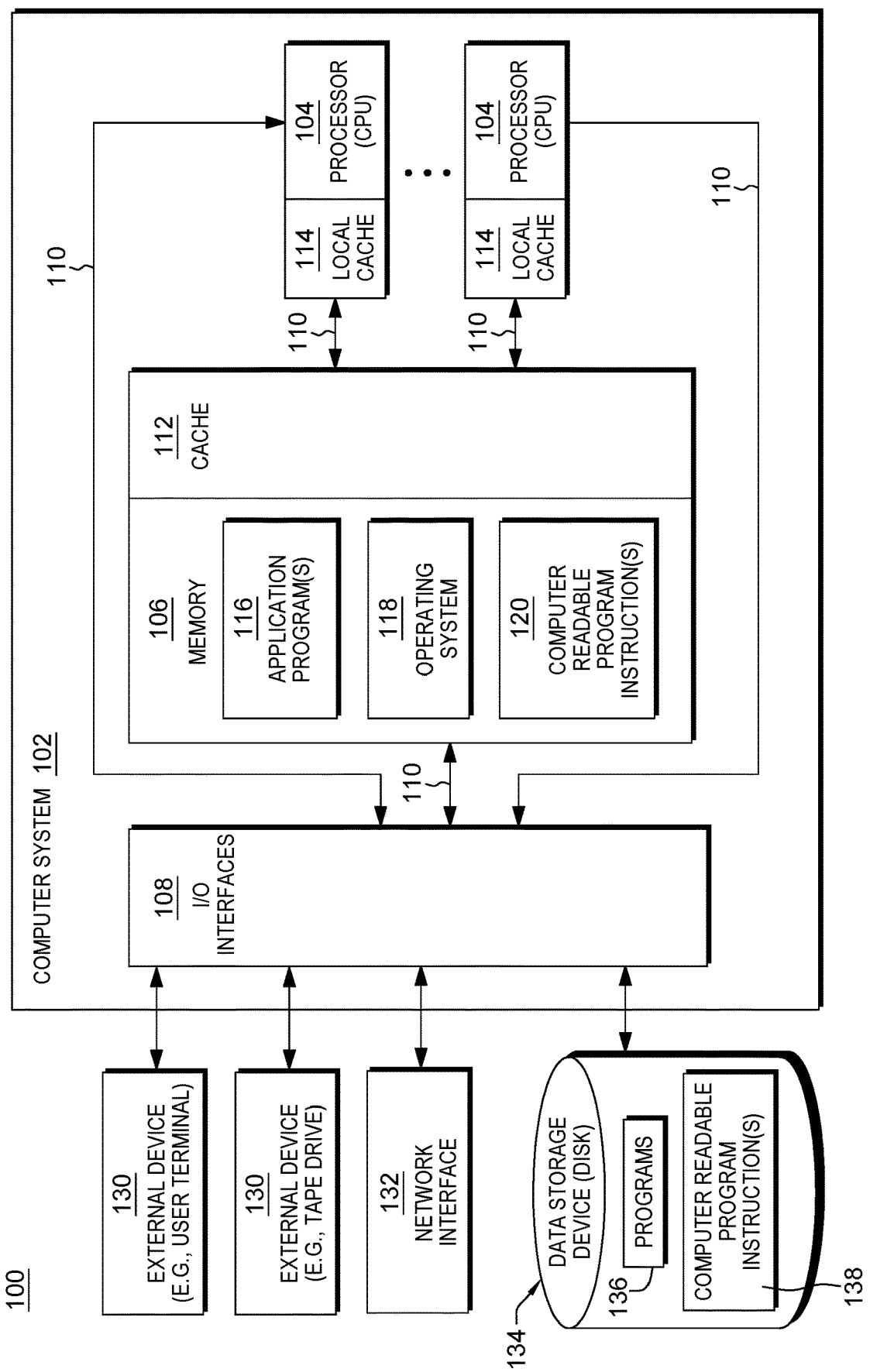
FIG. 1A depicts one example of a computing environment to incorporate and use one or more aspects of the present invention.

In accordance with an aspect of the present invention, a capability is provided to facilitate processing within a computing environment. As one example, a single instruction (e.g., a single architected hardware machine instruction at the hardware/software interface) is provided to perform scale, convert and split operations. The instruction, referred to herein as a Decimal Scale and Convert and Split to Hexadecimal Floating Point instruction, is part of a general-purpose processor instruction set architecture (ISA), which is dispatched by a program on a processor, such as a general-purpose processor. (In another example, the instruction may be part of a special-purpose processor, such as a co-processor configured for certain functions.)

As part of execution of the single instruction (e.g., the Decimal Scale and Convert and Split to Hexadecimal Floating Point instruction), various operations are performed including scaling the input data using a scale factor to provide scaled data, converting the scaled data from one format (e.g., binary coded decimal) to another format (e.g., hexadecimal floating point), and splitting the result (e.g., the hexadecimal floating point number) into multiple parts. Each part of the split result may be used independently of another part and/or selected parts may be combined to provide a result with greater precision. Each of these operations is performed as part of executing the single instruction, improving system performance, and reducing use of system resources.

In one example, as indicated, the conversion is from binary coded decimal to hexadecimal floating point. Binary coded decimal is a binary encoding of a decimal number, in which each decimal digit is represented by a fixed number of bits (e.g., 4 or 8 bits). Hexadecimal floating point is a format for encoding floating point numbers. In one example, a hexadecimal floating point number includes a sign bit, a characteristic (e.g., 7 bits) and a fraction (e.g., 6, 14 or 28 digits). The characteristic represents a signed exponent and is obtained by adding, e.g., 64 to the exponent value. The range of the characteristic is 0 to 127, which corresponds to an exponent range of, e.g., −64 to +63. The magnitude of a hexadecimal floating point number is the product of its fraction and the number 16 raised to the power of the exponent that is represented by its characteristic. The number is positive or negative depending on whether the sign bit is, e.g., zero or one, respectively.

A hexadecimal floating point number may be represented in a number of different formats, including a short format (e.g., 32-bit), a long format (e.g., 64-bit) and an extended format (e.g., 128-bit). In each format, the first bit (e.g., the first leftmost bit, bit 0) is the sign bit; the next selected number of bits (e.g., seven bits) are the characteristic, and in the short and long formats, the remaining bits are the fraction, which include, e.g., six or fourteen hexadecimal digits, respectively. In the extended format, the fraction is, e.g., a 28-digit fraction, and the extended hexadecimal floating point number consists of two long format numbers that are called the high-order and the low-order parts. The high-order part is any long hexadecimal floating point number. The fraction of the high-order part contains, e.g., the leftmost 14 hexadecimal digits of the 28-digit fraction, and the fraction of the low-order part contains, e.g., the rightmost 14 hexadecimal digits of the 28-digit fraction. The characteristic and sign of the high-order part are the characteristic and sign of the extended hexadecimal floating point number, and the sign and characteristic of the low-order part of an extended operand are ignored.

One embodiment of a computing environment to incorporate and use one or more aspects of the present invention is described with reference to FIG. 1A. As an example, the computing environment is based on the z/Architecture® hardware architecture, offered by International Business Machines Corporation, Armonk, N.Y. One embodiment of the z/Architecture hardware architecture is described in a publication entitled, "z/Architecture Principles of Operation," IBM Publication No. SA22-7832-12, Thirteenth Edition, September 2019, which is hereby incorporated herein by reference in its entirety. The z/Architecture hardware architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Referring to FIG. 1A, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 112, such as a shared cache, which may be coupled to local caches 114 of processors 104. Further, memory 106 may include one or more programs or applications 116 and at least one operating system 118. An example operating system includes a z/OS® operating system, offered by International Business Machines Corporation, Armonk, N.Y. z/OS is a trademark or registered trademark of International Business Machines Corporation in at least one jurisdiction. Other operating systems offered by International Business Machines Corporation and/or other entities may also be used. Memory 106 may also include one or more computer readable program instructions 120, which may be configured to carry out functions of embodiments of aspects of the invention.

Computer system 102 may communicate via, e.g., I/O interfaces 108 with one or more external devices 130, such as a user terminal, a tape drive, a pointing device, a display, and one or more data storage devices 134, etc. A data storage device 134 may store one or more programs 136, one or more computer readable program instructions 138, and/or data, etc. The computer readable program instructions may be configured to carry out functions of embodiments of aspects of the invention.

Computer system 102 may also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general-purpose or special-purpose computing system environments or configurations. Examples of well-known computing systems, environments, and/or configurations that may be suitable for use with computer system 102 include, but are not limited to: personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
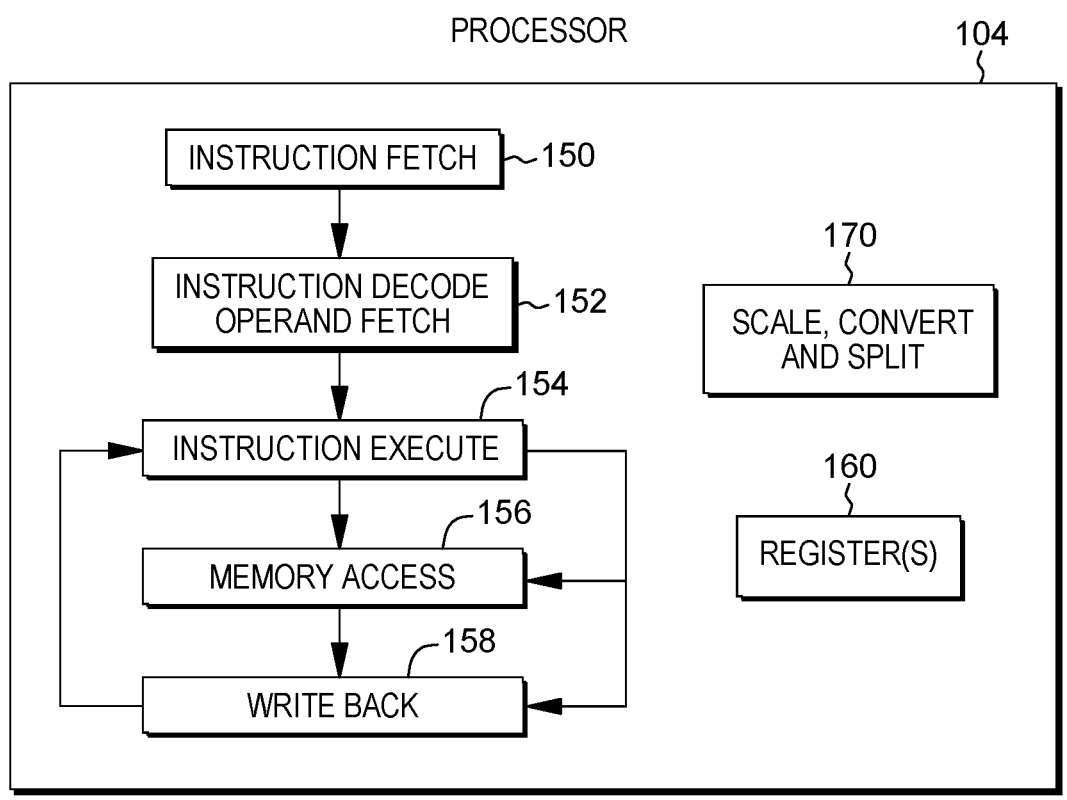
FIG. 1B depicts further details of a processor of FIG. 1A, in accordance with one or more aspects of the present invention.

In one example, a processor (e.g., processor 104) includes a plurality of functional components used to execute instructions. As depicted in FIG. 1B, these functional components include, for instance, an instruction fetch component 150 to fetch instructions to be executed; an instruction decode unit 152 to decode the fetched instructions and to obtain operands of the decoded instructions; one or more instruction execute components 154 to execute the decoded instructions; a memory access component 156 to access memory for instruction execution, if necessary; and a write back component 158 to provide the results of the executed instructions. One or more of the components may access and/or use one or more registers 160 in instruction processing. Further, one or more of the components may, in accordance with one or more aspects of the present invention, include at least a portion of or have access to one or more other components used in performing scaling, converting and/or splitting operations of, e.g., a Decimal Scale and Convert and Split to a Hexadecimal Floating Point instruction (or other processing that may use one or more aspects of the present invention), as described herein. The one or more other components include, for instance, a scale, convert and split component (or one or more other components) 170.

In accordance with an aspect of the present invention, an instruction, referred to herein as a Decimal Scale and Convert and Split to Hexadecimal Floating Point instruction, is provided to perform, as part of executing the one instruction, scaling, converting and splitting operations to convert a number from one format (e.g., decimal) to another format (e.g., hexadecimal floating point).

One embodiment of a Decimal Scale and Convert and Split to Hexadecimal Floating Point instruction used to perform scale, convert and split operations is described with reference to FIG. 2. The instruction is executed, in one example, using a general-purpose processor (e.g., processor 104). In the description herein, specific locations, specific fields and/or specific sizes of the fields are indicated (e.g., specific bytes and/or bits). However, other locations, fields and/or sizes may be provided. Further, although the setting of a bit to a particular value, e.g., one or zero, may be specified, this is only an example. The bit may be set to a different value, such as the opposite value or to another value, in other examples. Many variations are possible.

In one example, the Decimal Scale and Convert and Split to Hexadecimal Floating Point instruction has a VRR-b format that denotes a vector register and register operation with an extended operation code (opcode). In one embodiment, the Decimal Scale and Convert and Split to Hexadecimal Floating Point instruction is part of a vector facility, which provides, for instance, fixed sized vectors ranging from one to sixteen elements. Each vector includes data which is operated on by vector instructions defined in the facility. In one embodiment, if a vector is made up of multiple elements, then each element is processed in parallel with the other elements. Instruction completion does not occur, in one example, until processing of all the elements is complete. In other embodiments, the elements are processed partially in parallel and/or sequentially.

In one embodiment, there are 32 vector registers and other types of registers can map to a quadrant of the vector registers. For instance, a register file, which is an array of processor registers in a central processing unit (e.g., processor 104), may include 32 vector registers and each register is 128 bits in length. Sixteen floating point registers, which are 64 bits in length, can overlay the vector registers. Thus, as an example, when floating point register 2 is modified, then vector register 2 is also modified. Other mappings for other types of registers are also possible.

Vector data appears in storage, for instance, in the same left-to-right sequence as other data formats. Bits of a data format that are numbered 0-7 constitute the byte in the leftmost (lowest-numbered) byte location in storage, bits 8-15 form the byte in the next sequential location, and so on. In a further example, the vector data may appear in storage in another sequence, such as right-to-left.

Figure 2:
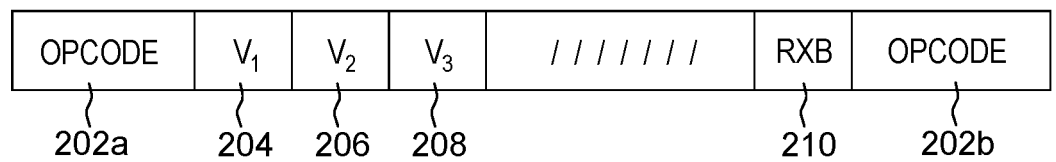
FIG. 2 depicts one example of a format of a Decimal Scale and Convert and Split to Hexadecimal Floating Point instruction, in accordance with one or more aspects of the present invention.

As shown in FIG. 2, in one example, a Decimal Scale and Convert and Split to Hexadecimal Floating Point instruction 200 has a plurality of fields, and a field may have a subscript number associated therewith. The subscript number associated with a field of the instruction denotes the operand to which the field applies. For instance, the subscript number 1 associated with vector register $V_1$ denotes that the register specified using $V_1$ includes the first operand, and so forth. A register operand is one register in length, which is, for instance, 128 bits.

In one embodiment, Decimal Scale and Convert and Split to Hexadecimal Floating Point instruction 200 includes operation code (opcode) fields 202a, 202b (e.g., bits 0-7 and 40-47) indicating scale, convert and split operations, in which the input data is, e.g., a decimal number (e.g., a binary coded decimal number) and the output is, e.g., a hexadecimal floating point value; a first vector register ($V_1$) field 204 (e.g., bits 8-11) used to designate a first vector register; a second vector register ($V_2$) field 206 (e.g., bits 12-15) used to designate a second vector register; a third vector register ($V_3$) field 208 (e.g., bits 16-19) used to designate a third vector register; and a register extension bit (RXB) field 210 (e.g., bits 36-39), each of which is described below. In one embodiment, the fields are separate and independent from one another; however, in other embodiments, more than one field may be combined. Further information regarding these fields is described below.

In one embodiment, vector register ($V_1$) field 204 is used to indicate a vector register that is to store the first operand. The first operand is a result of scaling and converting a decimal value to a hexadecimal floating point value, and splitting the hexadecimal floating point value into multiple (e.g., two) operands. The second operand is contained in the vector register specified using vector register ($V_2$) field 206 and is, for instance, a signed packed decimal number (e.g., a binary coded decimal having, e.g., 31 digits plus a sign) that is scaled using an unsigned integer included in the third operand, which is contained in the vector register specified using vector register ($V_3$) field 208.

In one example, each of vector register fields 204, 206, 208 is used with RXB field 210 to designate the vector register. For instance, RXB field 210 includes the most significant bit for a vector register designated operand. Bits for register designations not specified by the instruction are to be reserved and set to zero. The most significant bit is concatenated, for instance, to the left of the four-bit register designation of the vector register field to create a five-bit vector register designation.

In one example, the RXB field includes four bits (e.g., bits 0-3), and the bits are defined, as follows:

0—Most significant bit for the first vector register designation (e.g., in bits 8-11) of the instruction.

1—Most significant bit for the second vector register designation (e.g., in bits 12-15) of the instruction, if any.

2—Most significant bit for the third vector register designation (e.g., in bits 16-19) of the instruction, if any.

3—Most significant bit for the fourth vector register designation (e.g., in bits 32-35) of the instruction, if any.

Each bit is set to zero or one by, for instance, the assembler depending on the register number. For instance, for registers 0-15, the bit is set to 0; for registers 16-31, the bit is set to 1, etc.

In one embodiment, each RXB bit is an extension bit for a particular location in an instruction that includes one or more vector registers. For instance, bit 0 of RXB is an extension bit for location 8-11, which is assigned to, e.g., $V_1$, and so forth. In particular, for vector registers, the register containing the operand is specified using, for instance, a four-bit field of the register field with the addition of its corresponding register extension bit (RXB) as the most significant bit. For instance, if the four bit field is 0110 and the extension bit is 0, then the five bit field 00110 indicates register number 6. In a further embodiment, the RXB field includes additional bits, and more than one bit is used as an extension for each vector or location.

In execution of one embodiment of the Decimal Scale and Convert and Split to Hexadecimal Floating Point instruction, the second operand is scaled using an unsigned integer in a selected location (e.g., byte element seven) of the third operand and converted to a hexadecimal floating point number. The second operand is multiplied by a scale factor which is equal to, for instance, 10 to the power of byte element seven of the third operand. The scaled result is converted to, e.g., a hexadecimal floating point value, which is split into, e.g., two hexadecimal floating point operands, using normalization and truncation. The two hexadecimal floating point operands, as an example, are placed into the first operand register.

Further details of one embodiment of processing based on execution of a Decimal Scale and Convert and Split to Hexadecimal Floating Point instruction, in accordance with one or more aspects of the present invention, are described with reference to FIGS. 3-7. In one example, a processor, such as a general processor 104, is used to execute the instruction. As an example, hardware of the processor is used to execute the instruction. The hardware may be within the processor or coupled thereto for purposes of receiving the instruction from the processor, which, e.g., obtains, decodes and sets up as the instruction to execute on the hardware. Other variations are possible.

Figure 3:
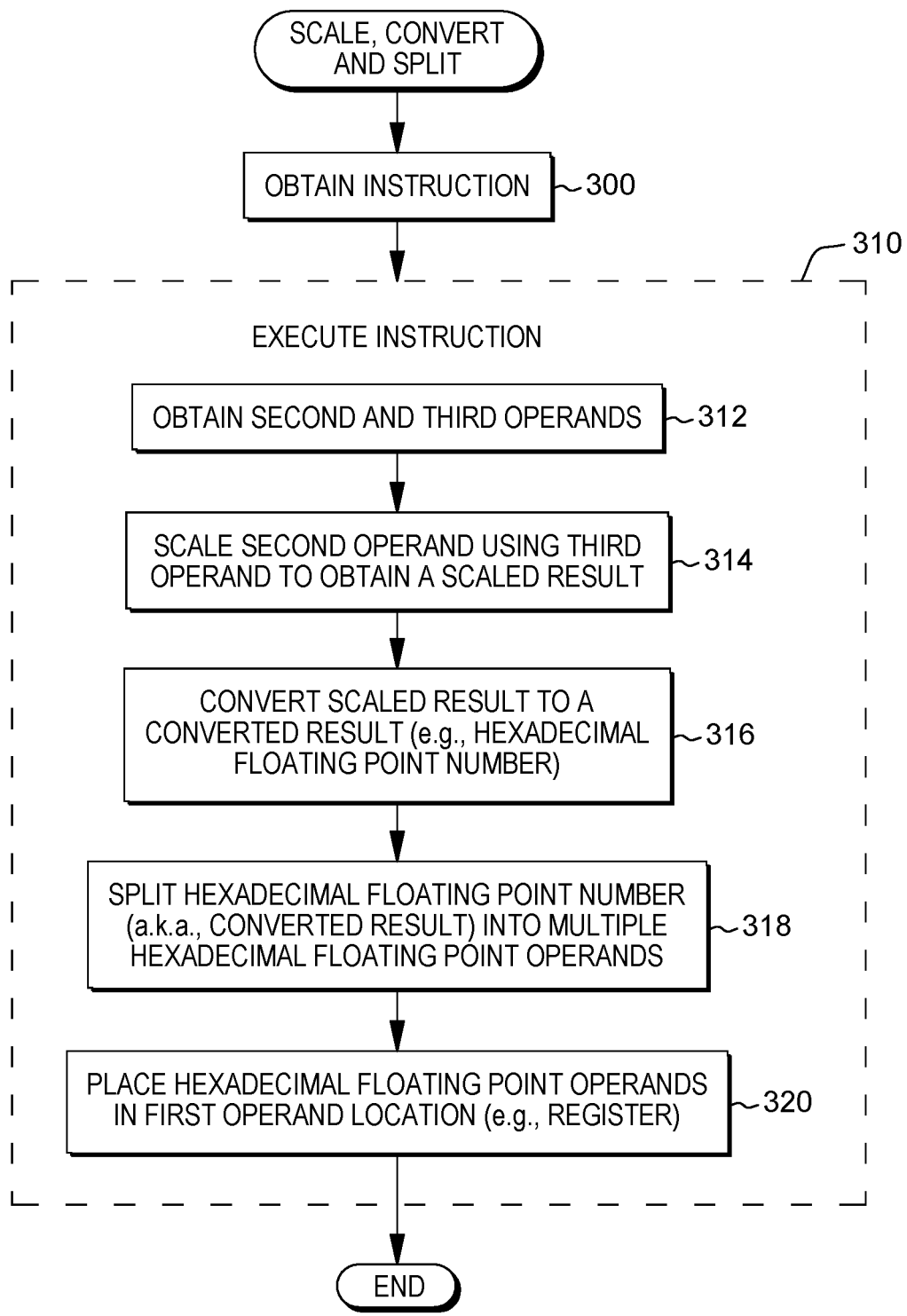
FIG. 3 depicts one example of processing associated with execution of a Decimal Scale and Convert and Split to Hexadecimal Floating Point instruction, in accordance with one or more aspects of the present invention.

Referring to FIG. 3, initially, an instruction, such as a Decimal Scale and Convert and Split to Hexadecimal Floating Point instruction, is obtained (e.g., fetched, received, provided, etc.) 300, and executed 310. The executing includes, for instance, obtaining the second and third operands of the instruction 312. The second operand is, for instance, a signed packed decimal number obtained from a location (e.g., a vector register) specified by the instruction (e.g., using $V_2$ field 206), and the third operand is, for instance, an unsigned integer obtained from a location (e.g., a vector register) specified by the instruction (e.g., using $V_3$ field 208). In one example, the unsigned integer is located in byte element seven of the third operand.

The second operand (e.g., the signed packed decimal number obtained using $V_2$) is scaled using the unsigned integer in, e.g., byte element seven of the third operand (obtained using, e.g., $V_3$) to obtain a scaled result 314.

The scaled result, which is in one format (e.g., decimal, such as binary coded decimal), is converted to a converted result in another format 316. For instance, the scaled decimal number is converted to a hexadecimal floating point number. The converted result is split into multiple parts. For instance, the hexadecimal floating point number is split into multiple (e.g., two) hexadecimal floating point operands 318, and one or more of those operands (e.g., the two operands) are placed in the first operand location (e.g., a register specified using $V_1$) 320. Further details regarding the scaling, converting, splitting and placing are described with reference to FIGS. 4-6.

Figure 4:
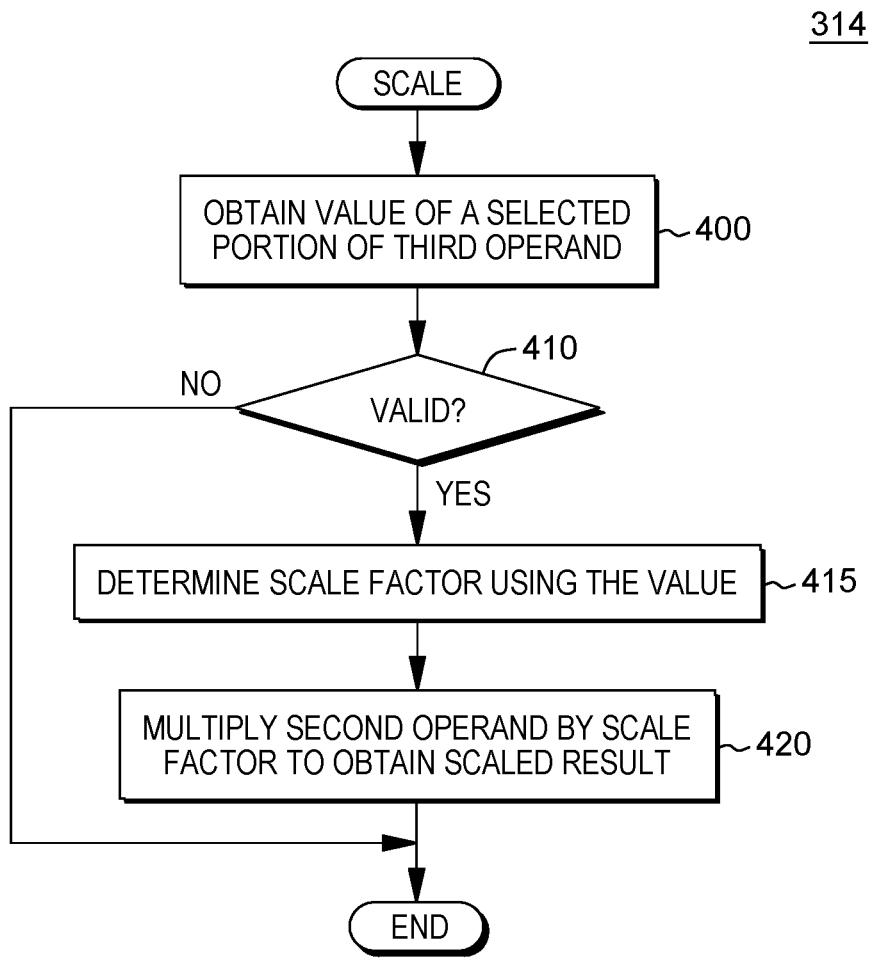
FIG. 4 depicts one example of processing associated with a scaling operation of the Decimal Scale and Convert and Split to Hexadecimal Floating Point instruction, in accordance with one or more aspects of the present invention.

Referring initially to FIG. 4, one embodiment of performing the scaling of the second operand (314 of FIG. 3) is described. In one example, a value, referred to as a scale value, of a selected portion (e.g., byte element seven) of the third operand (stored in a vector register designated using $V_3$) is obtained (400). A determination is made as to whether the value is valid (410). For instance, a determination is made as to whether the value has a predetermined relationship with a preselected value, e.g., is the value less than a preselected value, such as 8, as an example? If the value is invalid, the processing ends, e.g., with an error. However, if the value is valid, processing continues with using the value to determine a scale factor. For instance, the scale factor is equal to 10 to the power of the value (415). The second operand is multiplied by the scale factor to obtain a scaled result 420. In one example, since the second operand is a signed packed decimal number, the scaling by a power of 10 is equivalent to shifting the digits left. The scaling facilitates conversion of the signed packed decimal number to a hexadecimal floating point number.

The scaled result, which is in one format (e.g., a decimal format), is then converted to a converted result, which is in another format (e.g., a hexadecimal floating point format) (316 of FIG. 3). The conversion may be performed using a number of techniques. In one example, to convert a decimal number to a hexadecimal number:

The decimal number is divided by 16 into a quotient and a remainder;

The remainder times 16 is a digit of the hexadecimal number, starting with the rightmost digit;

The quotient is divided by 16 to provide another quotient and remainder; and

The process repeats starting at the remainder times 16 until the quotient is 0.

Although the above technique may be used to convert a decimal number to a hexadecimal number, other techniques may also be used. In one example, hardware logic is used to facilitate the conversion, improving the speed at which the processing may be performed.

Figure 5:
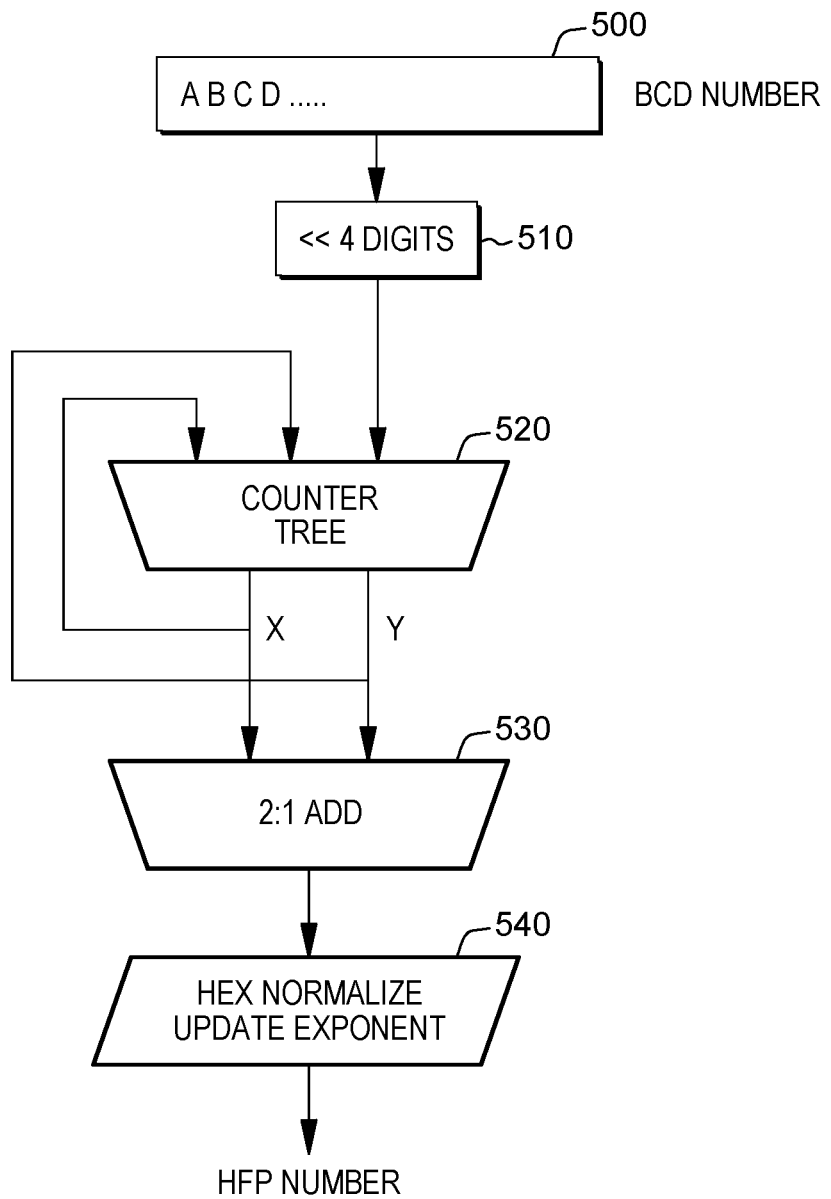
FIG. 5 depicts one example of processing logic to perform a converting operation of the Decimal Scale and Convert and Split to Hexadecimal Floating Point instruction, in accordance with one or more aspects of the present invention.
Figure 6:
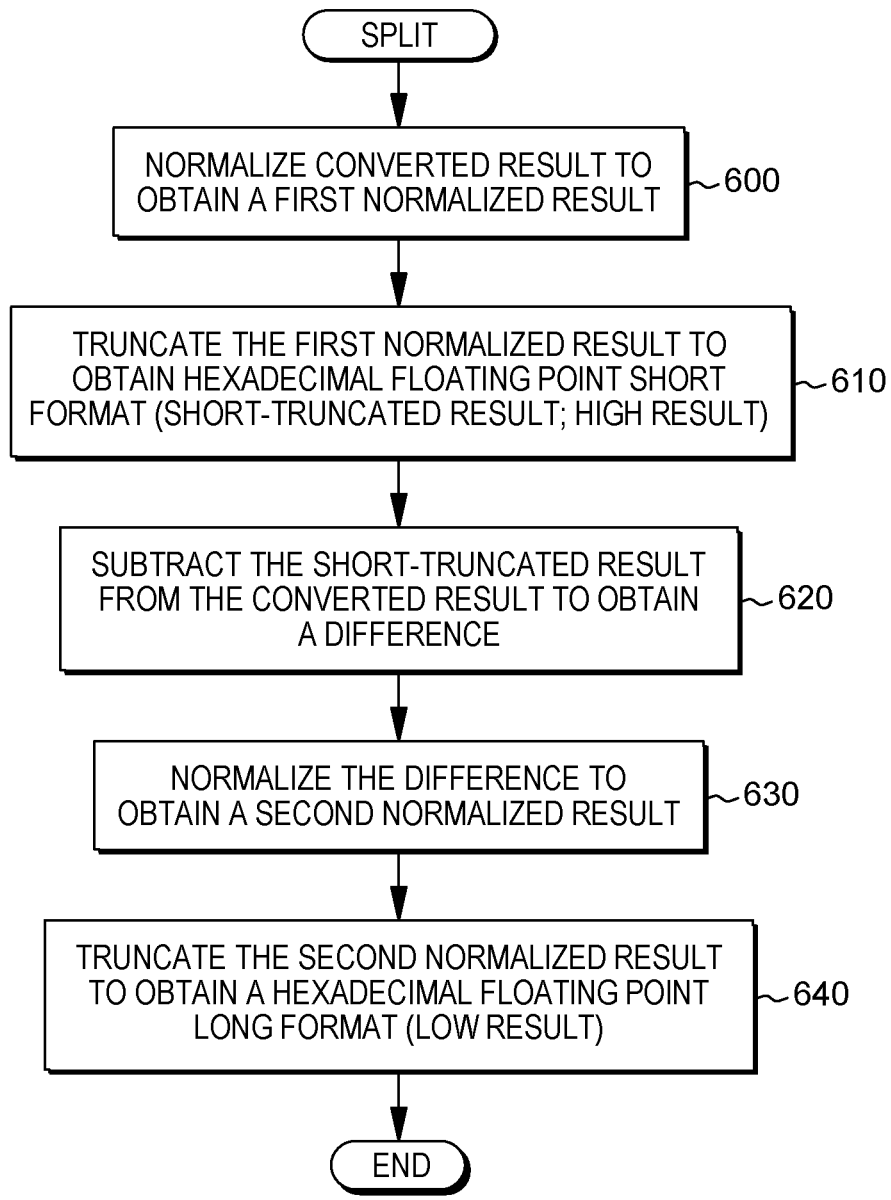
FIG. 6 depicts one example of processing associated with a splitting operation of the Decimal Scale and Convert and Split to Hexadecimal Floating Point instruction, in accordance with one or more aspects of the present invention.
Figure 7:
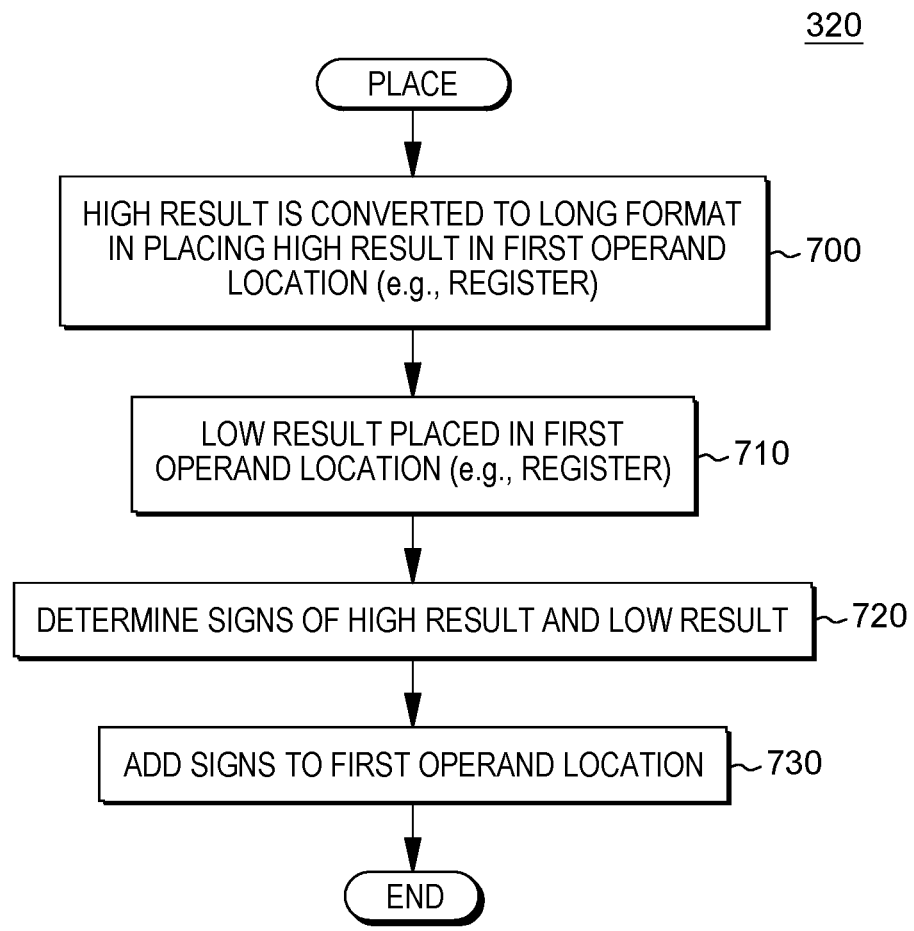
FIG. 7 depicts one example of processing associated with a placing operation of the Decimal Scale and Convert and Split to Hexadecimal Floating Point instruction, in accordance with one or more aspects of the present invention.

One example of hardware logic used to perform the converting is described with reference to FIG. 5. Referring to FIG. 5, in one example, a binary coded decimal number 500 is input to the logic. Initially, up to 4 digits of the binary coded decimal number are selected 510, starting at the leftmost digits of the binary coded decimal number. The selected digits are input to a counter tree 520, which uses a redundant format of the digits and an equation to multiply each digit. In one example, the multiplying is performed by shifting the number, in which each power of 2 multiply is a shift of the number.

One example of an equation used by the counter tree is as follows, in which (X'+Y') is initially set to 0 and represents a value resulting from a previous loop in the counter tree, and A, B, C, D are digits of the binary coded decimal (BCD) number.

$$\text{New Sum} = X + Y = (X' + Y') * 10000 + A * 1000 + B * 100 + C * 10 + D$$

$$= (X' + Y') * (2^{13} + 2^{11} - 2^8 + 2^4)$$

$$+ A * (2^9 + 2^8 + 2^7 + 2^6 + 2^5 + 2^3)$$

$$+ B * (2^6 + 2^5 + 2^2)$$

$$+ C * (2^3 + 2^1)$$

$$+ D.$$

The processing loops in the counter tree until all of the digits of the BCD number have been processed. Output of counter tree 520 is input to a 2:1 adder 530, which provides an intermediate converted result (e.g., intermediate hexadecimal floating point number) in a non-redundant format. The output of adder 530 is input to hex normalize, update exponent logic 540, which is used to normalize the output of the adder and update the exponent to provide a hexadecimal floating point number. For instance, the normalization shifts to the left any leading zero digits which are to the right of the radix point to remove those digits, and decreases the exponent by one for each shift.

One particular example of the above processing for an 8 digit BCD number is described herein. In the following example, since the actual values of X and Y are implementation specific (e.g., X and Y may be different values but still have the same sum), Z is used which is independent of the implementation. Thus, Z=X+Y; Z'=X'+Y'; and Z' is initialized to 0. Further, in this example, BCD=32610423, and therefore, initially, A=3; B=2; C=6; D=1.

| Formula | HexadecimalValue |
|---|---|
| $Z = 0 * (2^{13} + 2^{11} - 2^8 + 2^4)$ | $Z = x0$ |
| $+ 3 * (2^9 + 2^8 + 2^7 + 2^6 + 2^5 + 2^3)$ | $+xBB8$ |
| $+ 2 * (2^6 + 2^5 + 2^2)$ | $+xC8$ |
| $+ 6 * (2^3 + 2^1)$ | $+x3C$ |
| $+1$ | $+x1$ |
| $Z = 0 + 3000 + 200 + 60 + 1 = 3261$ | $Z = xCBD$ |
| Next, $A = 0; B = 4; C = 2; D = 3$ | |
| $Z = 3261 * (2^{13} + 2^{11} - 2^8 + 2^4)$ | $Z = 1F196D0$ |
| $+ 0 * (2^9 + 2^8 + 2^7 + 2^6 + 2^5 + 2^3)$ | $+x0$ |
| $+ 4 * (2^6 + 2^5 + 2^2)$ | $+x190$ |
| $+ 2 * (2^3 + 2^1)$ | $+x14$ |
| $+ 3$ | $+x3$ |
| $Z = 32610000 + 400 + 20 + 3 = 32610423$ | $Z = x1F19877$ |

The hexadecimal floating point number (also referred to herein as the converted result) is split into multiple parts, such as two hexadecimal floating point operands (318 of FIG. 3). For instance, the hexadecimal floating point number is split using normalization and truncation, as described further with reference to FIG. 6. In one embodiment, the hexadecimal floating point number (a.k.a., converted result) is normalized to obtain a first normalized result (600). The first normalized result is truncated to a hexadecimal floating point short format, referred to as a short-truncated result or a high result (610). As an example, the fractional portion of the hexadecimal floating point number (i.e., the digits after the characteristic) are normalized (e.g., the leading zeros are removed) to provide the first normalized result and then any digits after, e.g., six digits, since it is the short format, are truncated.

The short-truncated result is subtracted from the converted result to obtain a difference (620). The difference is normalized, as described herein, to obtain a second normalized result (630), and the second normalized result is truncated to a hexadecimal long format (e.g., truncate digits after, e.g., 14 digits, since it is the long format), referred to as a low result (640). The high and low results are the two hexadecimal floating point operands resulting from the converting and the splitting. In one example, if the low result is equal to zero, it is forced to a true zero.

One or more of the results are placed in the first operand location. In one example, the high and low results are placed into the first operand location (320 of FIG. 3), as described in further detail with reference to FIG. 7. In one embodiment, the high hexadecimal floating point short format result is converted to a hexadecimal long format. For instance, the short result is placed in bits 0 to 31 of the first operand location (e.g., vector register designated by $V_1$) and bits 32 to 63 are set to zeros in the first operand location 700. The low result in the hexadecimal floating point long format is placed, e.g., in bits 64 to 127 of the same location (e.g., same vector register) 710.

In one example, a determination is made of signs of the high and the low results 720. For instance, the sign of the high result is equal to the sign code of the second operand except when the second operand is a negative zero, then the high result is set equal to a zero with a positive sign. The sign of the low result equals the sign of the high result, in one example, except when the low result is forced to a true zero and the high result is a non-zero and negative. The determined signs are placed in the first operand location 730. For instance, bit 0 is set to the sign of the high result and bit 64 is set to the sign of the low result.

In one example, the digits and sign of the second operand are checked for validity. If the validity check fails, a general operand data exception is recognized.

Although various fields and registers of the Decimal Scale and Convert and Split to Hexadecimal Floating Point instruction are described, one or more aspects of the present invention may use other, additional and/or fewer fields and/or registers, and/or other sizes of fields and/or registers, etc. Many variations are possible. For instance, implied registers may be used instead of explicitly specified registers and/or fields of the instruction and/or explicitly specified registers and/or fields may be used instead of implied registers and/or fields. Other variations are also possible.

As described herein, in one aspect, a single instruction (e.g., a single architected machine instruction at the hardware/software interface, e.g., a Decimal Scale and Convert and Split to Hexadecimal Floating Point instruction) is provided to perform a scaling of a decimal number to provide a scaled decimal number, converting the scaled decimal number to a hexadecimal floating point number, and splitting the hexadecimal floating point number to multiple hexadecimal floating point numbers. This instruction is, for instance, a hardware instruction defined in an instruction set architecture (ISA) that directly converts a value in one format, e.g., a decimal number, to a value in another format, e.g., a hexadecimal floating point number. The conversion is direct from, e.g., a decimal number to a hexadecimal floating point number, rather than from, e.g., decimal to integer and integer to hexadecimal floating point. Processing is faster and more efficient than a program performing, for instance, a binary coded decimal multiply or shift, converting binary coded decimal to integer, converting integer to hexadecimal floating point and retaining enough digits to obtain a short precision high hexadecimal floating point number and a long precision low hexadecimal floating point number. The complexity of a program related to performing scale, convert and split operations is reduced. Further, performance of the operations, and thus, the processor, is improved. The hardware instruction execution reduces execution times and improves performance.

By using a single instruction to perform, e.g., the scaling, converting and splitting, rather than multiple instructions, performance is improved by not requiring multiple passes through the hardware/software interface. Further, by performing the processing as part of one instruction, the processing remains in the processing unit performing the operations (e.g., a floating point processing unit), not requiring prior to completing the processing, updating of the registers of a register file of the processor (i.e., an array of processor registers used to store data between memory and the functional units, e.g., a floating point processing unit). This improves execution time and reduces use of processor resources.

In one example, by splitting the hexadecimal floating point number into smaller parts (e.g., a hexadecimal floating point short high number and a hexadecimal floating point long low number, the smaller parts may be used independently and/or multiple smaller parts may be summed together to provide a result of greater precision.

One or more aspects of the present invention are inextricably tied to computer technology and facilitate processing within a computer, improving performance thereof. The use of a single architected machine instruction to perform a scale of a decimal number (e.g., a binary coded decimal number) to obtain a scaled decimal number, to convert the scaled decimal number to a hexadecimal floating point number, and to split the hexadecimal floating point number into multiple parts improves performance within the computing environment by reducing complexity, reducing use of resources and increasing processing speed. The data and/or instruction may be used in many technical fields, such as in computer processing, medical processing, engineering, automotive technologies, manufacturing, etc. By providing optimizations in converting the data, these technical fields are improved by reducing execution time.

Further details of one embodiment of facilitating processing within a computing environment, as it relates to one or more aspects of the present invention, are described with reference to FIGS. 8A-8B.

Figure 8A:
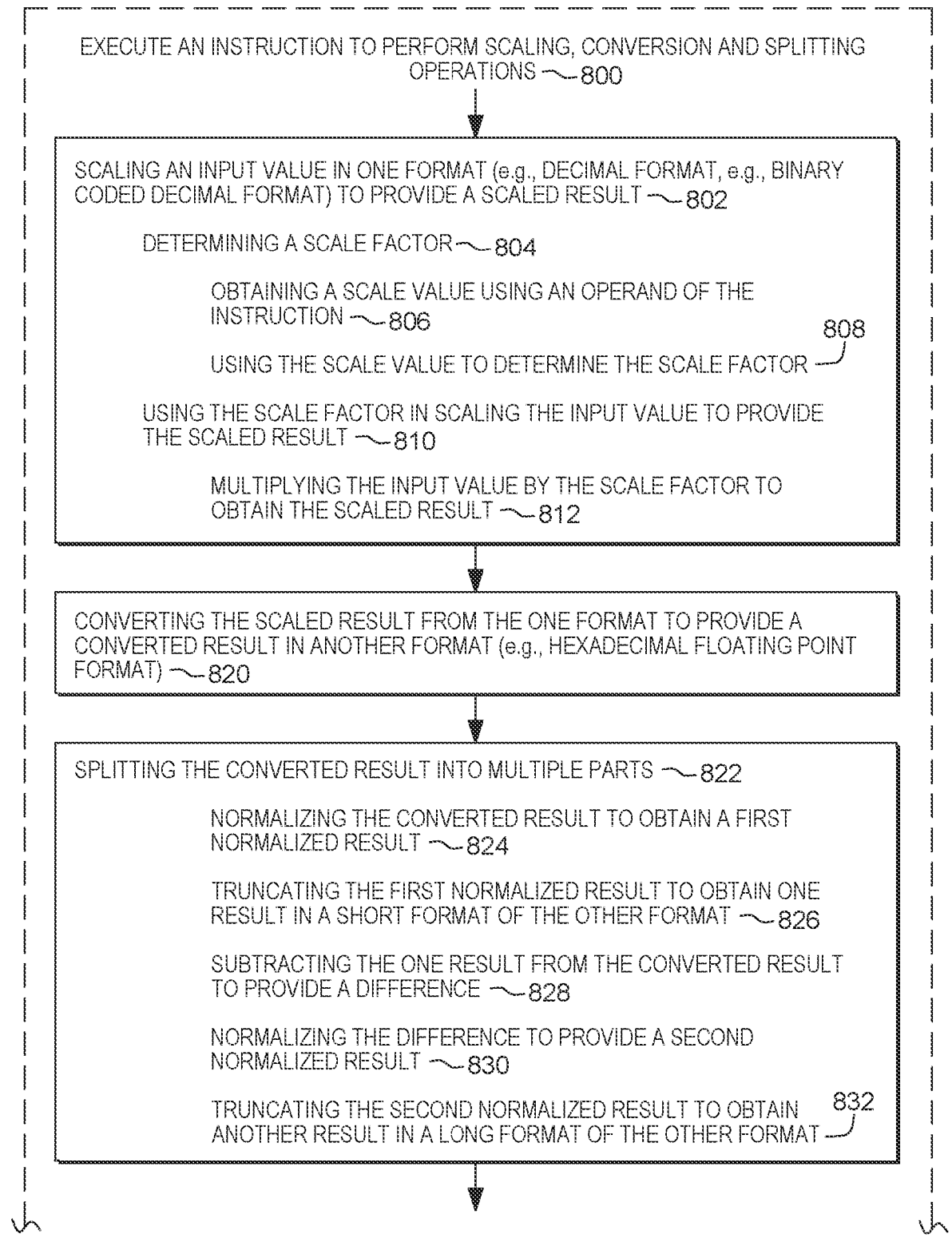
FIGS. 8A-8B depict one example of facilitating processing within a computing environment, in accordance with one or more aspects of the present invention.

Referring to FIG. 8A, in one embodiment, an instruction is executed to perform scaling, converting and splitting operations 800. By using a single instruction to perform, at least, the scaling, converting and splitting operations, performance is improved, and utilization of resources is reduced. The executing the instruction includes, for instance, scaling an input value in one format (e.g., a decimal format, such as, e.g., a binary coded decimal format) to provide a scaled result 802.

In one example, the scaling includes determining a scale factor 804 and using the scale factor in scaling the input value to provide the scaled result 810. The determining the scale factor includes, for instance, obtaining a scale value using an operand of the instruction 806, and using the scale value to determine the scale factor 808, The input value is multiplied by the scale factor to obtain the scaled result 812.

The executing the instruction further includes, in one embodiment, converting the scaled result from the one format to provide a converted result in another format (e.g., a hexadecimal floating point format) 820. The scaling facilitates the conversion of a value in one format (e.g., decimal) to another format (e.g., hexadecimal floating point) by isolating certain digits of a number to indicate a selected location in the number to truncate or round, as examples. The hexadecimal floating point format provides enhanced precision, which is beneficial for various technologies, improving accuracy and/or performance.

In one example, the executing the instruction further includes splitting the converted result into multiple parts 822. The splitting includes normalizing the converted result to obtain a first normalized result 824 and truncating the first normalized result to obtain one result in a short format of the other format 826. In one example, the splitting further includes subtracting the one result from the converted result to provide a difference 828, normalizing the difference to provide a second normalized result 830 and truncating the second normalized result to obtain another result in a long format of the other format 832.

By splitting the hexadecimal floating point number into smaller parts, the smaller parts may be used independently, and/or the smaller parts may be summed together to provide a result of greater precision.

Figure 8B:
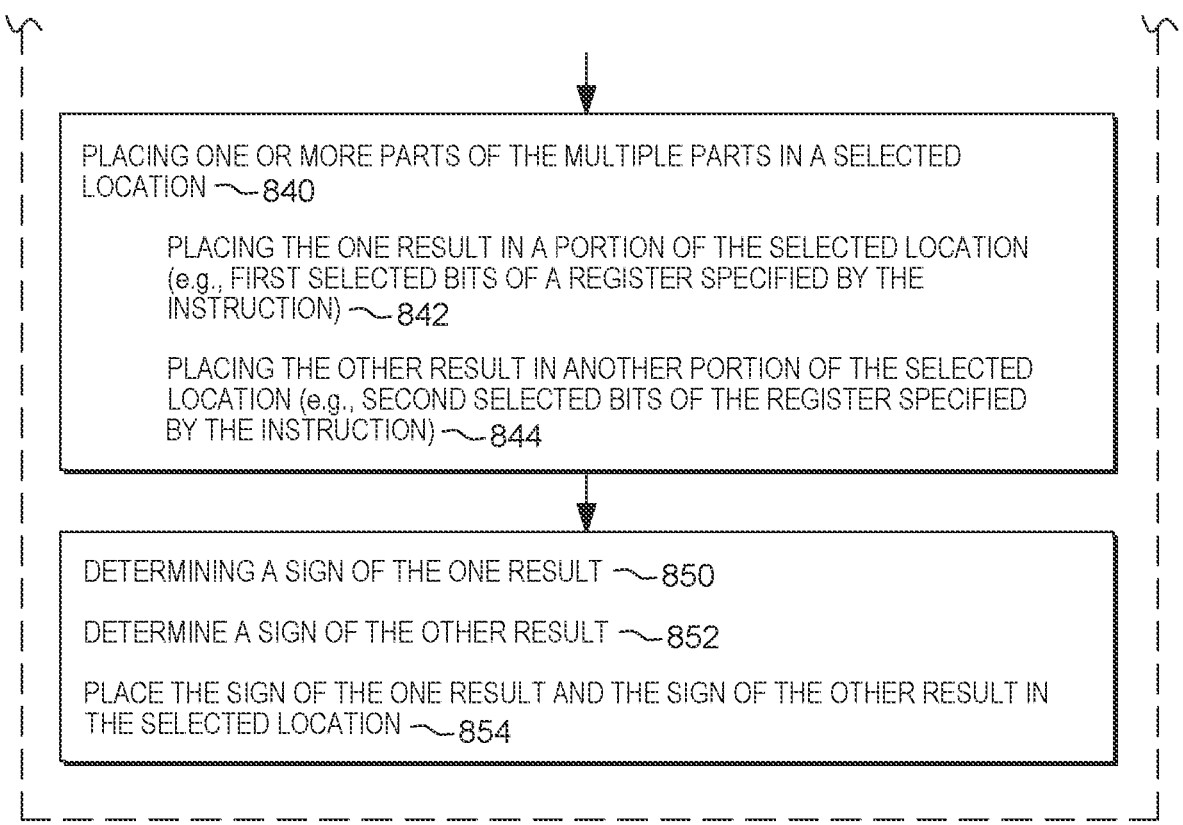

Referring to FIG. 8B, in one example, the executing the instruction further includes placing one or more parts of the multiple parts in a selected location (840). As an example, the placing includes placing the one result in a portion of the selected location (e.g., first selected bits of a register specified by the instruction) 842 placing the other result in another portion of the selected location (e.g., second selected bits of the register specified by the instruction) 844.

In one example, a sign of the one result is determined 850, a sign of the other result is determined 852, and the sign of the one result and the sign of the other result are placed in the selected location 854.

Other variations and embodiments are possible.

Figure 9A:
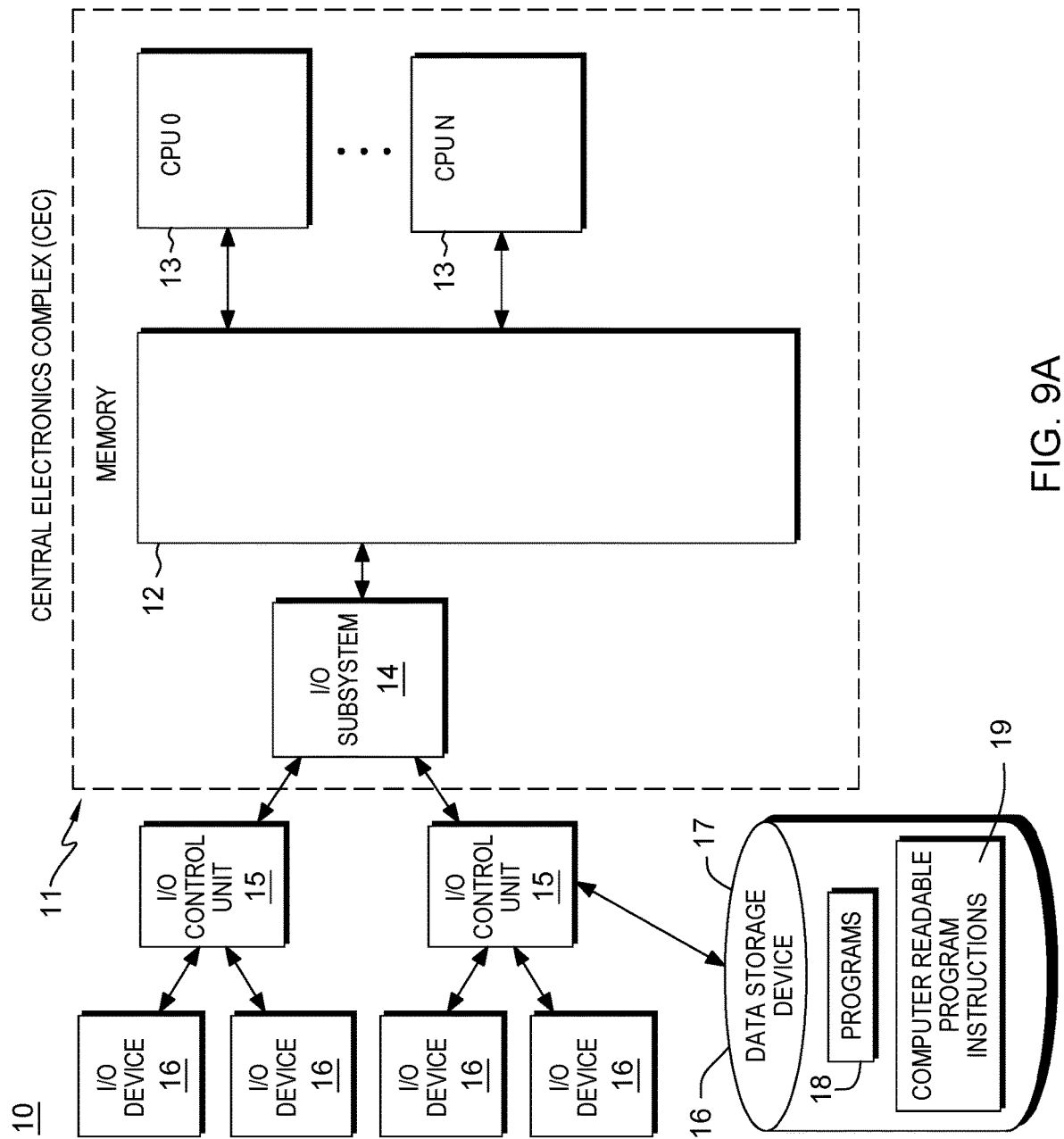
FIG. 9A depicts another example of a computing environment to incorporate and use one or more aspects of the present invention.

Aspects of the present invention may be used by many types of computing environments. Another example of a computing environment to incorporate and use one or more aspects of the present invention is described with reference to FIG. 9A. As an example, the computing environment of FIG. 9A is based on the z/Architecture® hardware architecture offered by International Business Machines Corporation, Armonk, N.Y. The z/Architecture hardware architecture, however, is only one example architecture. Again, the computing environment may be based on other architectures, including, but not limited to, the Intel® x86 architectures, other architectures of International Business Machines Corporation, and/or architectures of other companies. Intel is a trademark or registered trademark of Intel Corporation or its subsidiaries in the United States and other countries.

In one example, a computing environment 10 includes a central electronics complex (CEC) 11. Central electronics complex 11 includes a plurality of components, such as, for instance, a memory 12 (a.k.a., system memory, main memory, main storage, central storage, storage) coupled to one or more processors (a.k.a., central processing units (CPUs)) 13 and to an input/output (I/O) subsystem 14.

I/O subsystem 14 can be a part of the central electronics complex or separate therefrom. It directs the flow of information between main storage 12 and input/output control units 15 and input/output (I/O) devices 16 coupled to the central electronics complex.

Many types of I/O devices may be used. One particular type is a data storage device 17. Data storage device 17 can store one or more programs 18, one or more computer readable program instructions 19, and/or data, etc. The computer readable program instructions can be configured to carry out functions of embodiments of aspects of the invention.

Central electronics complex 11 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 11. Examples include, but are not limited to: microcode, device drivers, redundant processing units, external disk drive arrays, RAID systems, tape drives, and data archival storage systems, etc.

Further, central electronics complex 11 can be operational with numerous other general-purpose or special-purpose computing system environments or configurations. Examples of well-known computing systems, environments, and/or configurations that may be suitable for use with central electronics complex 11 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 9C:
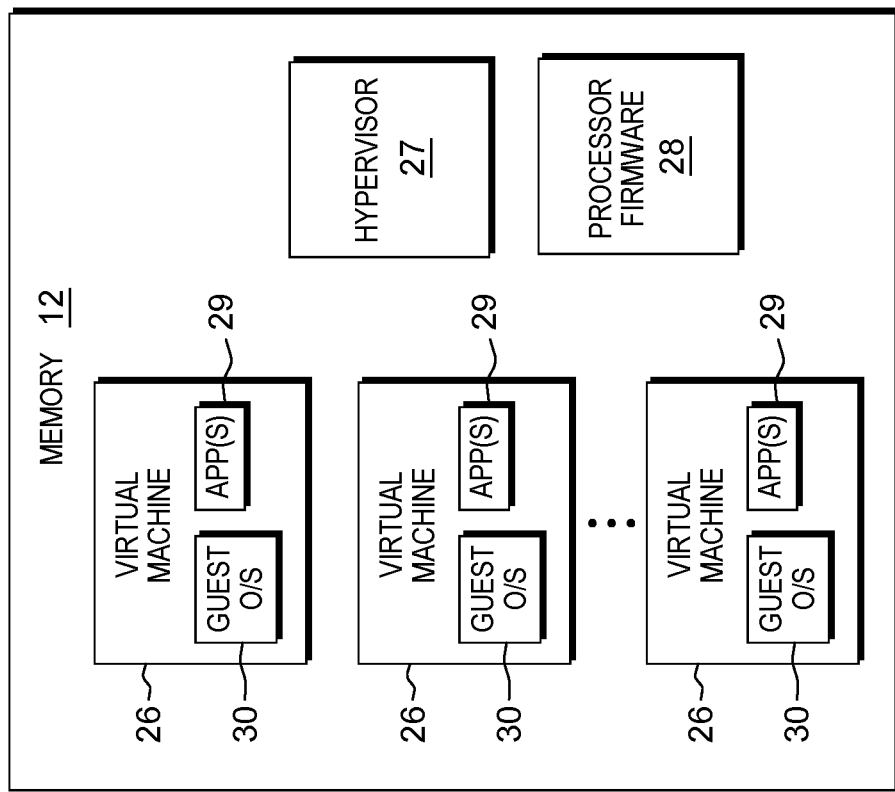
FIG. 9C depicts another example of further details of a memory of FIG. 9A, in accordance with one or more aspects of the present invention.
Figure 9B:
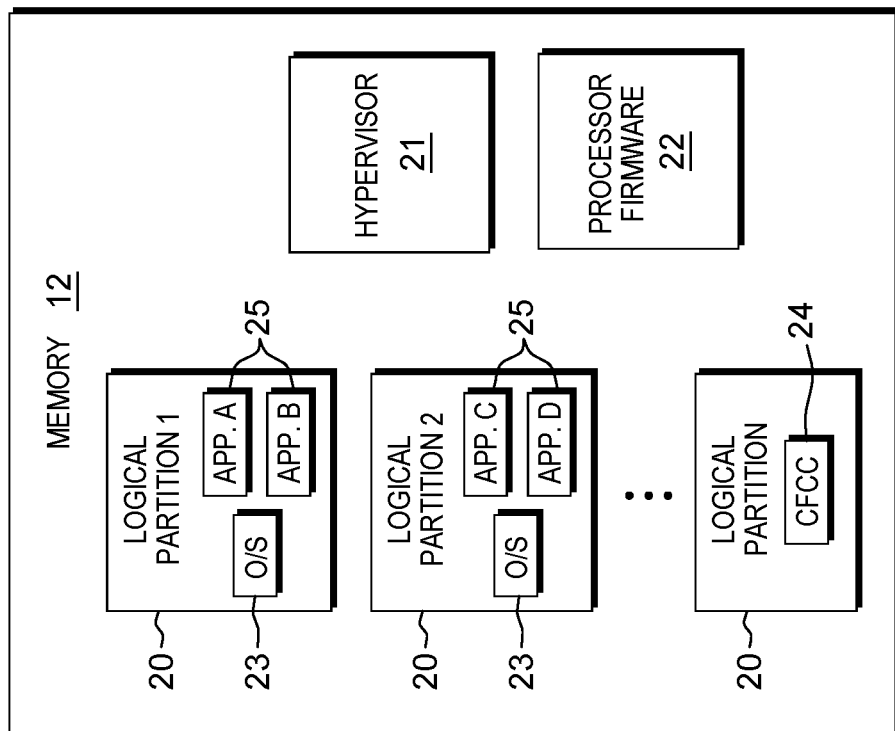
FIG. 9B depicts one example of further details of a memory of FIG. 9A, in accordance with one or more aspects of the present invention.

Central electronics complex 11 provides in one or more embodiments logical partitioning and/or virtualization support. In one embodiment, as shown in FIG. 9B, memory 12 includes, for example, one or more logical partitions 20, a hypervisor 21 that manages the logical partitions, and processor firmware 22. One example of hypervisor 21 is the Processor Resource/System Manager (PR/SM™), offered by International Business Machines Corporation, Armonk, N.Y. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware. PR/SM is a trademark or registered trademark of International Business Machines Corporation in at least one jurisdiction.

Each logical partition 20 is capable of functioning as a separate system. That is, each logical partition can be independently reset, run a guest operating system 23 such as the z/OS® operating system, offered by International Business Machines Corporation, Armonk, N.Y., or other control code 24, such as coupling facility control code (CFCC), and operate with different programs 25. An operating system or application program running in a logical partition appears to have access to a full and complete system, but in reality, only a portion of it is available. Although the z/OS operating system is offered as an example, other operating systems offered by International Business Machines Corporation and/or other companies may be used in accordance with one or more aspects of the present invention.

Memory 12 is coupled to CPUs 13 (FIG. 9A), which are physical processor resources that can be allocated to the logical partitions. For instance, a logical partition 20 includes one or more logical processors, each of which represents all or a share of a physical processor resource 13 that can be dynamically allocated to the logical partition.

In yet a further embodiment, the central electronics complex provides virtual machine support (either with or without logical partitioning support). As shown in FIG. 9C, memory 12 of central electronics complex 11 includes, for example, one or more virtual machines 26, a virtual machine manager, such as a hypervisor 27, that manages the virtual machines, and processor firmware 28. One example of hypervisor 27 is the z/VM® hypervisor, offered by International Business Machines Corporation, Armonk, N.Y. The hypervisor is sometimes referred to as a host. z/VM is a trademark or registered trademark of International Business Machines Corporation in at least one jurisdiction.

The virtual machine support of the central electronics complex provides the ability to operate large numbers of virtual machines 26, each capable of operating with different programs 29 and running a guest operating system 30, such as the Linux® operating system. Each virtual machine 26 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 10A:
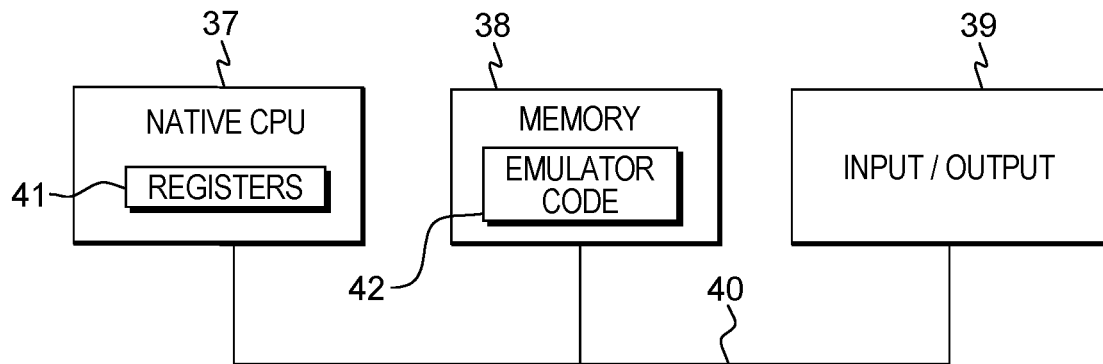
FIG. 10A depicts yet another example of a computing environment to incorporate and use one or more aspects of the present invention.

Another embodiment of a computing environment to incorporate and use one or more aspects of the present invention is described with reference to FIG. 10A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, N.Y.; an HP Superdome with Intel® Itanium® II processors offered by Hewlett Packard Co., Palo Alto, Calif.; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Itanium is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 10B:
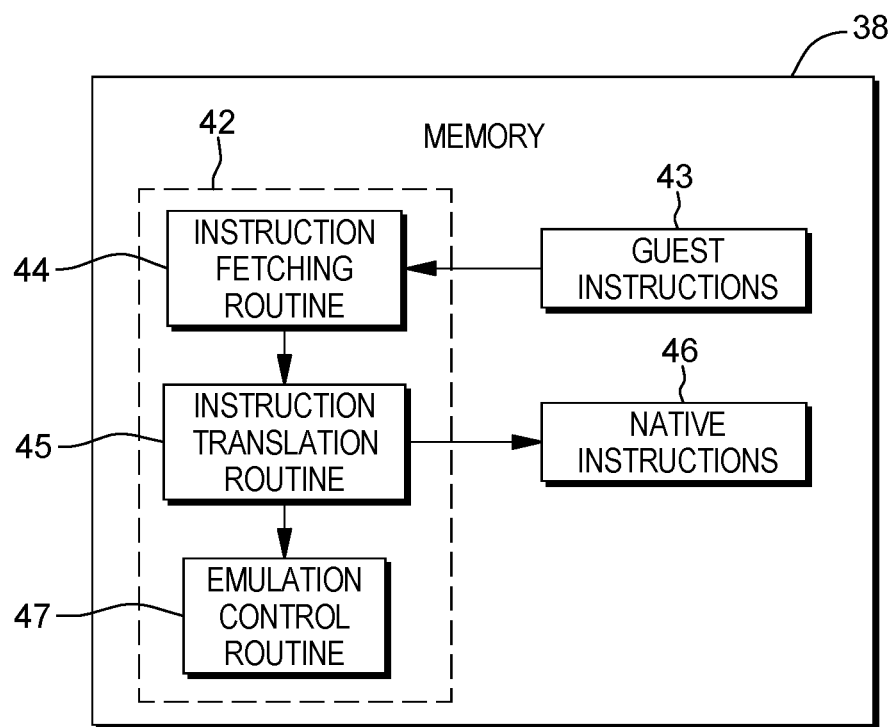
FIG. 10B depicts further details of the memory of FIG. 10A, in accordance with one or more aspects of the present invention.

Further details relating to emulator code 42 are described with reference to FIG. 10B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture hardware architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

One instruction that may be emulated is the Decimal Scale and Convert and Split instruction described herein, in accordance with an aspect of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
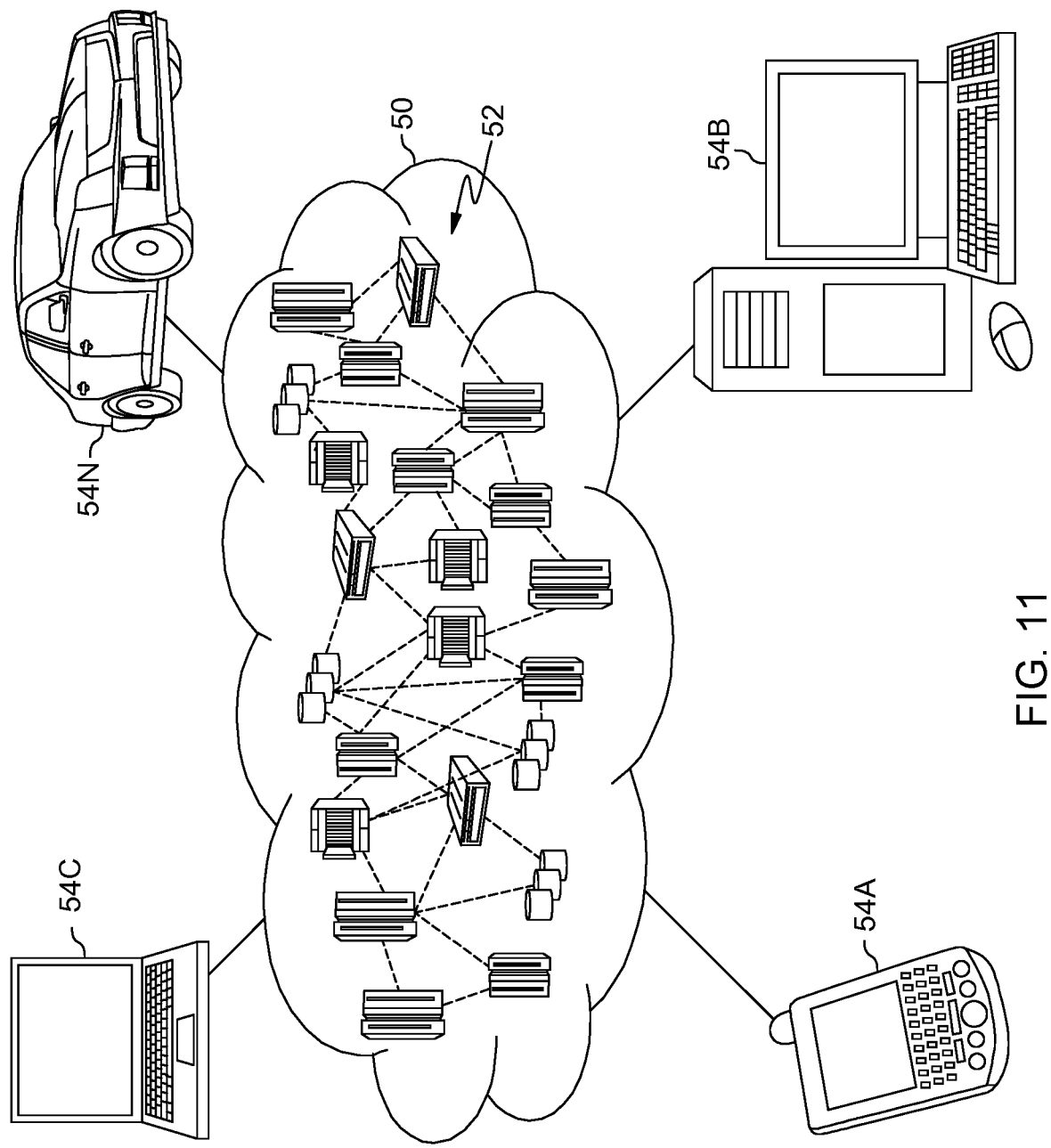
FIG. 11 depicts one embodiment of a cloud computing environment, in accordance with one or more aspects of the present invention.

Referring now to FIG. 11, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 52 and cloud computing environment 50 can communicate with any type of computerized device over any type of network and/or network addressable connection (e.g., using a web browser).

Figure 12:
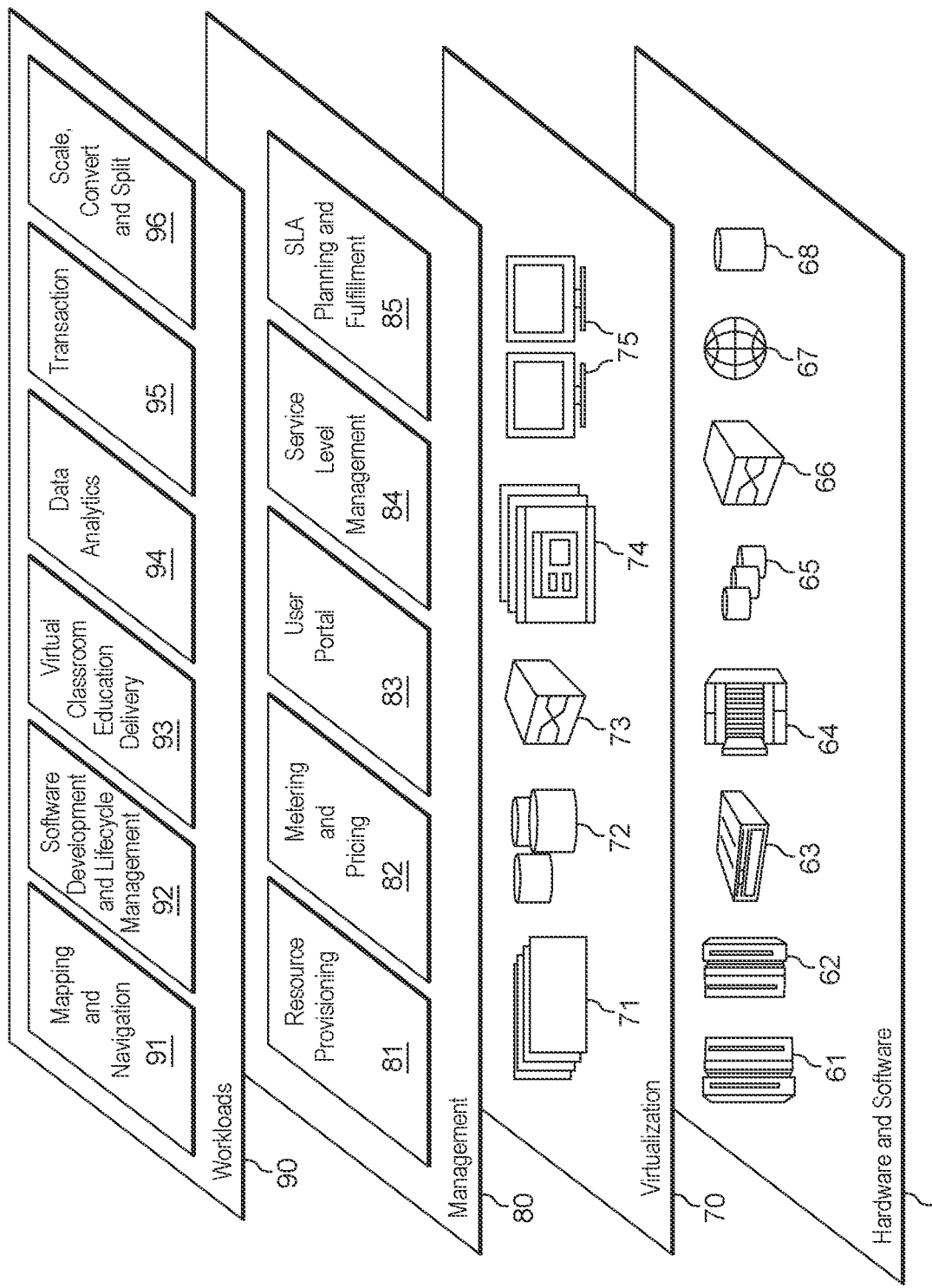
FIG. 12 depicts one example of abstraction model layers, in accordance with one or more aspects of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and scale, convert and split processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used. Additionally, different types of registers and/or different register may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
one or more computer readable storage media and program instructions collectively stored on the one or more computer readable storage media to perform a method comprising:
executing an instruction to perform scaling, converting and splitting operations, the executing the instruction comprising:
scaling an input value in one format to provide a scaled result;
converting the scaled result from the one format to provide a converted result in another format;
splitting the converted result into multiple parts; and
placing one or more parts of the multiple parts in a selected location.

2. The computer program product of claim 1, wherein the one format is a decimal format and the other format is a hexadecimal floating point format.

3. The computer program product of claim 2, wherein the decimal format is a binary coded decimal format.

4. The computer program product of claim 1, wherein the scaling comprises:
   determining a scale factor; and
   using the scale factor in scaling the input value to provide the scaled result.

5. The computer program product of claim 4, wherein the determining the scale factor comprises:
   obtaining a scale value using an operand of the instruction; and
   using the scale value to determine the scale factor;
   wherein the using the scale factor comprises multiplying the input value by the scale factor to obtain the scaled result.

6. The computer program product of claim 1, wherein the splitting comprises:
   normalizing the converted result to obtain a first normalized result; and
   truncating the first normalized result to obtain one result in a short format of the other format.

7. The computer program product of claim 6, wherein the splitting further comprises:
   subtracting the one result from the converted result to provide a difference;
   normalizing the difference to provide a second normalized result; and
   truncating the second normalized result to obtain another result in a long format of the other format.

8. The computer program product of claim 7, wherein the placing comprises:
   placing the one result in a portion of the selected location; and
   placing the other result in another portion of the selected location.

9. The computer program product of claim 8, wherein the portion of the selected location comprises first selected bits of a register specified by the instruction and the other portion of the selected location comprises second selected bits of the register specified by the instruction.

10. The computer program product of claim 8, wherein the executing the instruction further comprises:
    determining a sign of the one result;
    determining a sign of the other result; and
    placing the sign of the one result and the sign of the other result in the selected location.

11. A computer system for facilitating processing within a computing environment, the computer system comprising:
    a memory; and
    a processor in communication with the memory, wherein the computer system is configured to perform a method, said method comprising:
      executing, by the processor, an instruction to perform scaling, converting and splitting operations, the executing the instruction comprising:
        scaling an input value in one format to provide a scaled result;
        converting the scaled result from the one format to provide a converted result in another format;
        splitting the converted result into multiple parts; and
        placing one or more parts of the multiple parts in a selected location.

12. The computer system of claim 11, wherein the scaling comprises:
    determining a scale factor; and
    using the scale factor in scaling the input value to provide the scaled result.

13. The computer system of claim 11, wherein the splitting comprises:
    normalizing the converted result to obtain a first normalized result; and
    truncating the first normalized result to obtain one result in a short format of the other format.

14. The computer system of claim 13, wherein the splitting further comprises:
    subtracting the one result from the converted result to provide a difference;
    normalizing the difference to provide a second normalized result; and
    truncating the second normalized result to obtain another result in a long format of the other format.

15. The computer system of claim 14, wherein the placing comprises:
    placing the one result in a portion of the selected location; and
    placing the other result in another portion of the selected location.

16. A computer-implemented method of facilitating processing within a computing environment, the computer-implemented method comprising:
    executing an instruction to perform scaling, converting and splitting operations, the executing the instruction comprising:
      scaling an input value in one format to provide a scaled result;
      converting the scaled result from the one format to provide a converted result in another format;
      splitting the converted result into multiple parts; and
      placing one or more parts of the multiple parts in a selected location.

17. The computer-implemented method of claim 16, wherein the scaling comprises:
    determining a scale factor; and
    using the scale factor in scaling the input value to provide the scaled result.

18. The computer-implemented method of claim 16, wherein the splitting comprises:
    normalizing the converted result to obtain a first normalized result; and
    truncating the first normalized result to obtain one result in a short format of the other format.

19. The computer-implemented method of claim 18, wherein the splitting further comprises:
    subtracting the one result from the converted result to provide a difference;
    normalizing the difference to provide a second normalized result; and
    truncating the second normalized result to obtain another result in a long format of the other format.

20. The computer-implemented method of claim 19, wherein the placing comprises:
    placing the one result in a portion of the selected location; and
    placing the other result in another portion of the selected location.

* * * * *